United States Patent [19]

Petersen

[11] Patent Number: 4,824,178
[45] Date of Patent: Apr. 25, 1989

[54] FLUID PRESSURE RESPONSIVE AND ELECTRICALLY-CONTROLLED BRAKE SYSTEM

[75] Inventor: Erwin Petersen, Wunstorf, Fed. Rep. of Germany

[73] Assignee: WABCO Westinghouse Fahrzeugbremsen GmbH, Hanover, Fed. Rep. of Germany

[21] Appl. No.: 210,602

[22] Filed: Jun. 23, 1988

Related U.S. Application Data

[63] Continuation of Ser. No. 889,143, Jul. 24, 1986, abandoned.

[30] Foreign Application Priority Data

Aug. 3, 1985 [DE] Fed. Rep. of Germany ....... 3527907

[51] Int. Cl.⁴ .................. B60T 13/70; B60T 13/22
[52] U.S. Cl. ..................................... 303/15; 303/9.61; 303/71
[58] Field of Search ............... 303/3, 7, 6.01, 9.61, 303/13, 15, 16, 17, 20, 71, 50; 73/121, 129, 132; 188/106 P

[56] References Cited

U.S. PATENT DOCUMENTS

| Re. 29,096 | 1/1977 | Jones | 303/100 |
|---|---|---|---|
| 2,573,442 | 10/1951 | Hines | 303/15 |
| 4,339,154 | 7/1982 | Duttaret et al. | 303/3 |
| 4,400,039 | 8/1983 | Ogata | 303/71 |
| 4,407,548 | 10/1983 | Graham | 303/6 M |
| 4,484,784 | 11/1984 | Leiber | 303/92 |
| 4,546,845 | 10/1985 | Meyer et al. | 303/6.1 |
| 4,586,584 | 5/1986 | Auman et al. | 303/9 X |
| 4,608,825 | 9/1986 | Fontaine | 303/19 |

FOREIGN PATENT DOCUMENTS

| 1127388 | 4/1962 | Fed. Rep. of Germany . |
|---|---|---|
| 1961039 | 6/1971 | Fed. Rep. of Germany . |
| 2310293 | 9/1976 | Fed. Rep. of Germany . |
| 3020821 | 12/1980 | Fed. Rep. of Germany . |
| 3149110 | 6/1983 | Fed. Rep. of Germany . |
| 3205846 | 8/1983 | Fed. Rep. of Germany . |
| 2722435 | 2/1984 | Fed. Rep. of Germany . |
| 3344252 | 6/1984 | Fed. Rep. of Germany . |
| 3341975 | 6/1985 | Fed. Rep. of Germany . |
| 2527154 | 3/1983 | France . |
| 2535273 | 4/1984 | France . |
| 0140265 | 8/1982 | Japan . |

Primary Examiner—Andres Mashnikow
Assistant Examiner—Timothy Newholm
Attorney, Agent, or Firm—J. O. Ray, Jr.

[57] ABSTRACT

An electrically-controlled fluid pressure responsive brake system, in which a solenoid valve is installed between a manual brake valve and a parking brake. The parking brake is equipped with a spring actuator. The solenoid valve can be positioned by an electronic system into an open position only when an ignition switch has been turned on and the brake system has been successfully tested by the electronic system. The test can be initiated by pressing the brake pedal all the way to the floor. The solenoid valve allows the release of the parking brake only if the brake system is intact.

14 Claims, 2 Drawing Sheets

FLUID PRESSURE RESPONSIVE AND ELECTRICALLY-CONTROLLED BRAKE SYSTEM

This is a continuation of application Ser. No. 889,143, filed July 24, 1986, now abandoned.

FIELD OF THE INVENTION

The present invention relates, in general, to an electrically-controlled fluid pressure responsive brake system and, more particularly, the invention relates to a motor vehicle brake system which prevents putting such motor vehicle in motion until successful completion of both a passive and/or active test of the braking system.

BACKGROUND OF THE INVENTION

In all braking systems which are important for the safety of the operator and passengers, such as encountered in a motor vehicle brake system, it is imperative that particularly high requirements must be established in relation to the reliability and freedom from defects of such braking system. These requirements must be met by all of the important components of such brake system.

Prior to the present invention, electrically-controlled motor vehicle brake systems had been in the development stage for some time. When compared to conventional brake systems, used prior to the development of such electrically-controlled brake systems, the electrical processing of the brake signal results in both a savings in the brake equipment and increases in passenger comfort during braking. Furthermore, a particularly advantageous electrical brake system is one which allows the integration into the system of other functions. Such other functions may include load-controlled braking (ALB), anti-locking protection (ABS), anti-slip regulation (ASR), etc. One such electrical braking system having these functions is described in the prior art in German Patent No. DE-A3,239,970.

SUMMARY OF THE INVENTION

The present invention teaches an electrically-controlled hydraulic or pneumatic brake system in which a solenoid valve is installed between a manual brake valve and a parking brake that is equipped with a spring actuator. The solenoid valve can be positioned by an electronic system into an open position only when an ignition switch has been turned on and the braking systeem has been successfully tested by such electronic system. The testing of the braking system by the electronic system can be initiated by pressing the brake pedal all the way to the floor. After the test is complete, the solenoid valve will only allow the release of the parking brake if the brake system is intact.

OBJECTS OF THE INVENTION

It is, therefore, one object of the present invention to provide an electrically-controlled brake system for a motor vehicle which incorporates a test apparatus therein to ensure proper operation of such brake system.

Another object of the present invention is to provide an electrically-controlled brake system for motor vehicles in which the electronic system performs not only a passive test of the brake system before such vehicle may begin to move but also performs an extensive active test of such brake system.

Still another object of the present invention is to provide an electrically-controlled brake system for a motor vehicle in which the brake pedal must be depressed all the way to the floor as part of a brake system test by the electronic system before the vehicle can be put in motion.

Yet another object of the present invention is to provide an electrically-controlled brake system for a motor vehicle in which the brake pedal must be tested by the electronic system as part of a system test.

A further object of the present invention is to provide an electrically-controlled brake system for a motor vehicle in which a spring-activated parking brake cannot be released until the electronic system has completed a test of such brake system.

The above and various other objects and advantages of the present invention will become more readily apparent to those persons skilled in the electrically-controlled braking art from the following more detailed description when such description is taken in conjunction with the attached drawing figures and the appended claims.

BRIEF DESCRIPTION OF THE INVENTION

Figure 1:
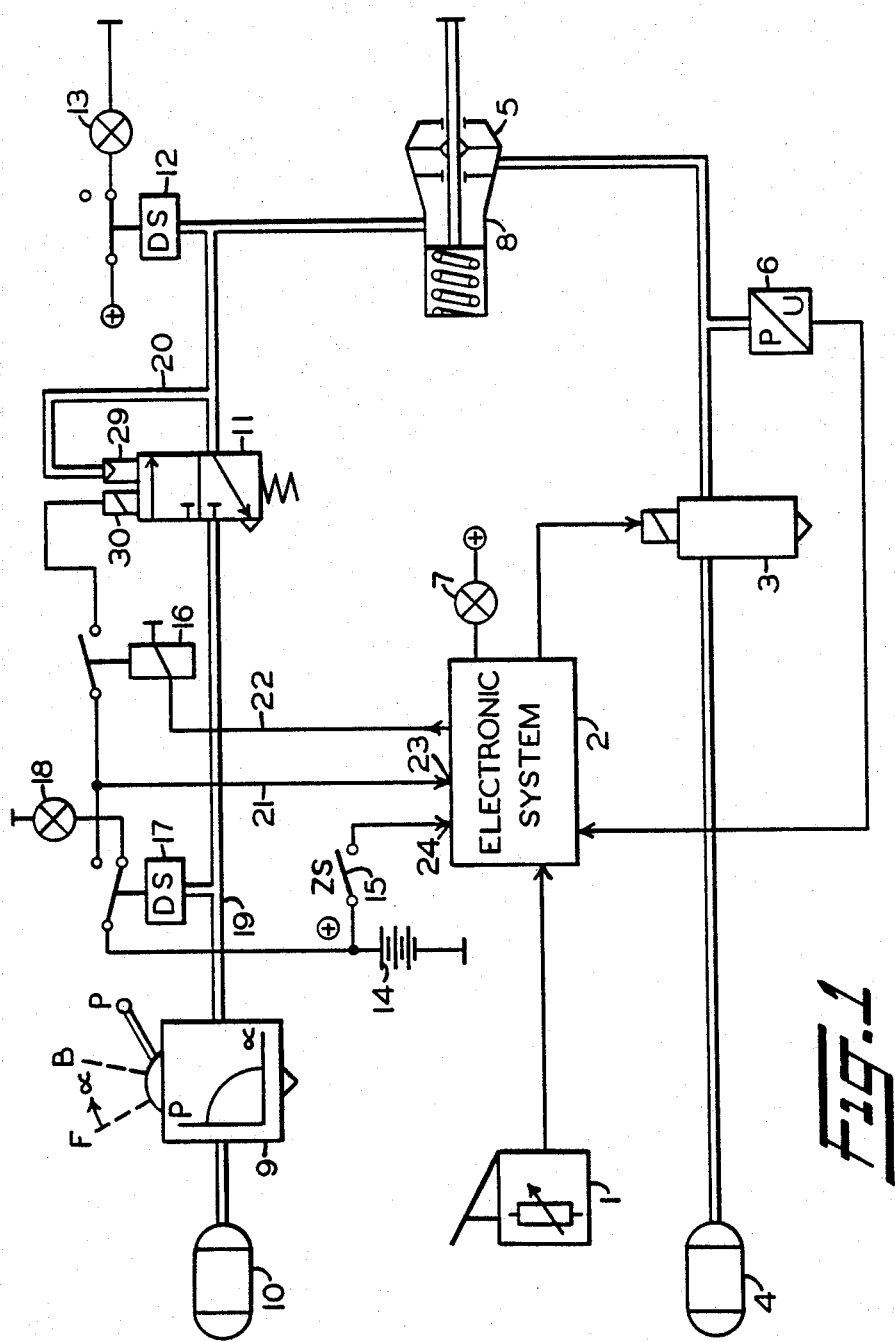
FIG. 1 is a schematic representation showing a first embodiment of an electrically-controlled brake system according to the present invention with an evacuating manual brake lever.

When referring to the drawings, it will be noted that identical components have been identified with identical reference numerals in each of the two embodiments.

The electrically-controlled brake system, schematically represented in FIG. 1, includes a first reservoir 4 for a fluid pressure medium, which can pressurize a brake cylinder 5 by means of a modulator 3. Such fluid pressure medium being selected from either hydraulic or pneumatic. The modulator 3 is designed as a solenoid valve and is activated by a signal from an electronic system 2. To make possible a precise regulation of the pressure which is released from the brake cylinder 5, there is a pressure measurement device 6, the electrical output signal from which is returned to the electronic system 2.

The electronic system 2 also receives a signal value from an electrical brake signal value transmitter 1. The presently-preferred brake signal value transmitter 1 is a brake pedal. The brake signal value transmitter 1 includes, for example, a resistance which changes the signal value being transmitted as a function of the position of its brake pedal.

There is a second reservoir 10 which is provided for the parking brake. The second reservoir 10 is connected via a manual brake lever 9 and a solenoid valve 11 to a spring actuator 8 in the brake cylinder 5. The manual brake lever 9 can be set in the positions F (travel), B (brake) and P (park). It is designed so that for the position F (travel), a high pressure above the spring actuator release pressure is released, and for the position P atmospheric pressure is released (ventilating hand brake lever). The pressure released behind the hand brake lever 9 into a line 19 is monitored by a first pressure switch (DS) 17. The pressure switch 17 connects, in the position shown in which the line 19 is evacuated, the positive pole of a battery 14 with a first warning light 18.

There is also a relay 16, which when engaged and when the pressure switch 17 is pressurized, connects the positive pole of the battery 14 with an electrical control 30 of the solenoid valve 11. The switching status of the pressure switch 17 is also transmitted via a line 21 to an input 23 of the electronic system 2. The line 21 can also be connected in a reactionless manner by means of a diode (not shown), with a connection 24 of the electronic system 2. The relay 16 can be controlled via a line 22 by the electronic system 2.

When line 19 is pressurized and when the solenoid valve 11 is engaged, i.e., reversed from the position shown in the drawing, the solenoid valve 11 goes into a pneumatic self-lock via a line 20 and a pneumatic control 29. As illustrated in FIG. 1, the self-locking solenoid valve 11 is equipped with a pneumatic holding mechanism. It can be seen that the solenoid valve 11 may be forced out of the rest position in a downwardly direction by the magnet 30. At this point, air can pass through the opened solenoid valve 11 into line 20 and thus maintain the solenoid valve 11 even further in the open position by means of the pneumatic control 29, even if the electric impulse at the magnet 30 should be terminated. This arrangement is recognized by those persons skilled in the art as a self-locking solenoid valve. The pressure of the spring actuator 8 is sensed via a second pressure switch (DS) 12. If the spring actuator pressure is too low, the second pressure switch 12 connects the positive pole of the battery 14 with a second warning light 13.

Also connected to the electronic system 2 is a third warning light 7, which lights when the vehicle is started, and thereafter whenever a defect is determined in the brake system.

Power can be supplied to the electronic system 2 via an input 24 from the ignition switch 15 (ZS).

The electrically-controlled brake system described above operates as follows:

To start the vehicle, the driver generally first activates the ignition switch 15. The electronic system 2 checks the wiring and other parts of the system passively, and possibly actively if desired. The electronic system 2, however, first of all prevents the transmission of any possible brake signal from the electrical braking signal value transmitter 1 to the modulator 3.

When the vehicle is standing still, the spring actuator 8 is engaged, i.e., evacuated, which is indicated by the warning lights 13 and 18. The solenoid valve 11 is in the evacuating position shown. The line 19 is also unpressurized, since the manual brake lever 9 is in the "park" position. The pressure switch 17 is in the position shown, so that there is no signal to the input 23 of the electronic system 2. The warning lamp 7 is controlled by the electronic system 2, since the check of the brake system has not yet been concluded.

For the active portion of the check, the driver must now press the brake pedal 1 all the way to the floor, i.e., operate it to at least 80% of its range, for example. Thereupon, the electronic system 2 performs an active test, whereby specifically the brake pedal 1, the modulator 3 and the pressure in the brake cylinder 5 or the brake force released by the brake cylinder 5 are checked by the electronic system 2 for the correct values. The correct values for the travel of the brake pedal 1 and the pressure or force increase in the brake cylinder 5 are contained in a memory (not shown) of the electronic system 2.

If the electronic system 2 finds no defaults, the warning light 7 goes out, and the relay 16 is activated, i.e., closed, via the line 22.

The driver now releases the manual brake lever 9 (position "drive"), whereupon the line 19 is pressurized and the pressure switch 17 reversed. The first warning light 18 thereby goes out, and the solenoid valve 11 reverses via the connection which now exists to the positive pole of the battery 14. The pressure in the line 19 thereby continues to the spring actuator 8, and releases the latter. At the same time, the solenoid valve 11 assumes a pneumatic self-locked position via a line 20. Then the warning lights 13 and 18 go out, which indicates to the driver that the spring actuator 8 has been released. The driver can not put the vehicle in motion.

Instead of the pneumatic self-locking of the solenoid valve 11, there can also be an electrical self-locking of the relay 16 (not shown).

The driver can start the vehicle in another manner, by first of all releasing the manual brake lever 9, without turning on the ignition switch. Then the electronic system receives power via the line 21 and the input 23, and is at least partly operationally ready.

The electronic system 2 then conducts a check of the wiring.

Then the driver presses the brake pedal 1 all the way to the floor, whereupon the above-mentioned active test is performed. The driver also turns on the ignition switch 15. In response to the voltage signal which is now simultaneously present at the inputs 23 and 24 of the electronic system 2, the latter turns on the relay 16 via the line 22, if the test has detected no errors. Only then does the spring actuator 8 release, or can it be released.

If the line 21, as mentioned above, is connected in a non-reactive manner with the connection 24 of the electronic system 2, it is then possible for the active portion of the test to be done with a brake activation, even without turning on the ignition switch 15.

The special advantage of the electronically-controlled brake system, according to this embodiment of the present invention, is that the electronic system 2 is electrically fed redundantly to the ignition switch 15 via the circuit 17, and that the vehicle cannot be started in motion if the electrical brake is defective, since the spring actuator 8 can only be released if the brake system has been successfully activated and tested.

Another significant advantage of the brake system of the present invention is the fact that a vehicle parked on a hill, for example, does not immediately roll backward even if the hand brake lever 9 is released, or even when the ignition swtich 15 is turned on, but only after the operational readiness of the brake system has been tested.

The self-locking feature of the solenoid valve 11 via the line 20 is necessary in the event that, if the power fails during travel for any reason, the spring actuator 8 is not suddenly evacuated by the reversal of the solenoid valve 11, with the result that the brake is automatically activated. As a result of the self-locking, the vehicle can also be towed even without a power supply.

Figure 2:
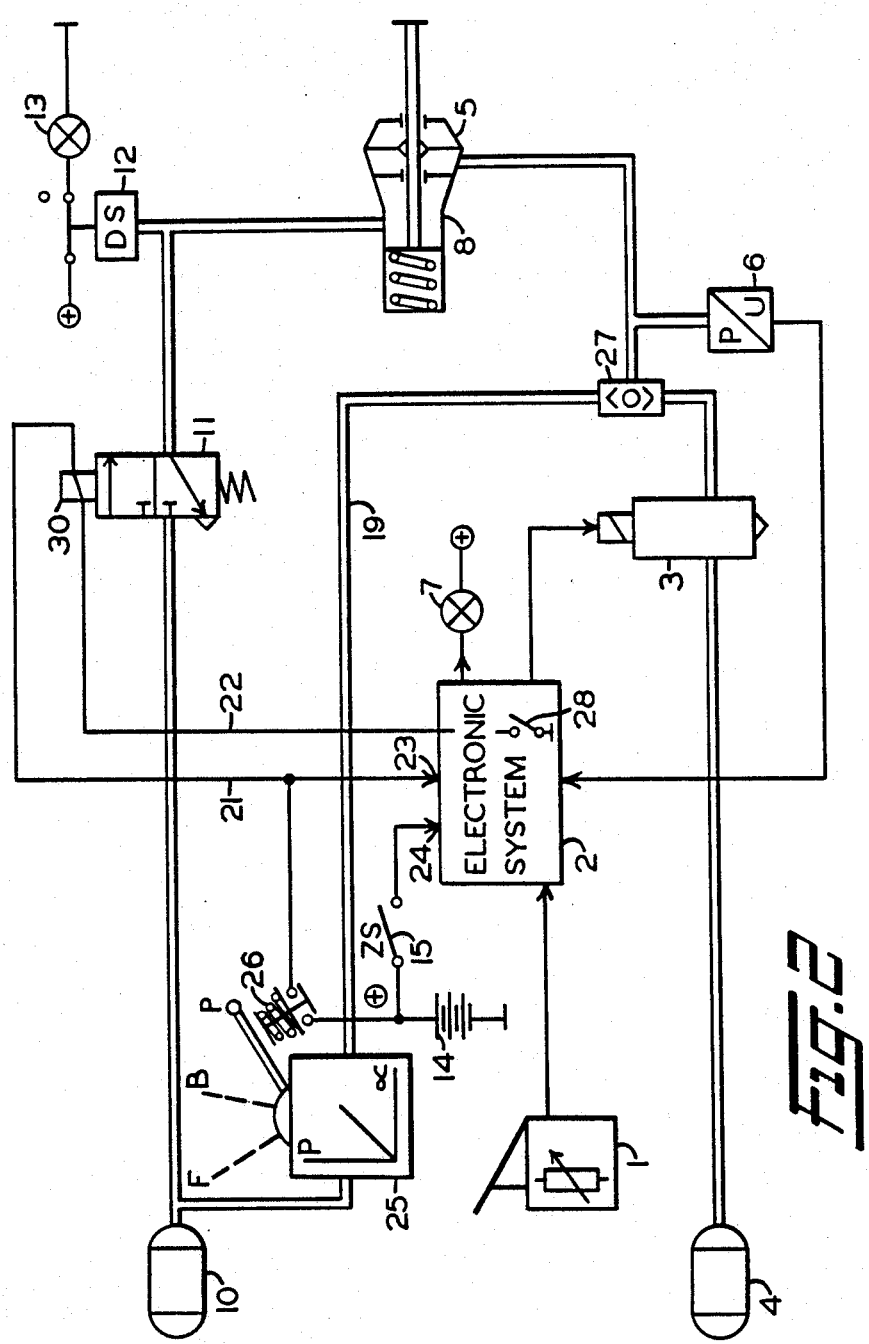
FIG. 2 is a schematic representation showing an alternative embodiment of an electrically-controlled brake system according to the present invention with a pressurizing hand brake lever.

The alternative brake system as schematically shown in FIG. 2, in contrast to FIG. 1, includes a pressurizing manual brake lever 25, which acts via a multiway valve 27 on the brake cylinder 5. This also applies for the brake position (B). However, once the park position (P)

is reached, instead of the pressure switch 17 in FIG. 1, here a switch 26 is activated (disengaged). The electrical control of the solenoid valve 11 is thereby removed. It thus moves into the position illustrated, whereby the spring actuator 8 is evacuated, i.e., activated. The other elements are the same as in FIG. 1.

Instead of the relay 16 shown in FIG. 1, here there is a switchable ground connection 28 in the electronic system 2, via which, and via the line 22, the current to control the solenoid valve 11 is closed following the successful testing of the system. For the activation of the solenoid valve 11 by the electronic system 2, there can be an electrical self-locking feature. Otherwise, the operation of the brake system in FIG. 2 is the same as the operation of the brake system illustrated in FIG. 1.

The equipment shown in FIGS. 1 and 2 is shown as a single circuit. For electrical two-circuit brake systems with two separate power sources and electronic system circuits (not shown), the activation of the solenoid valve 11 can be appropriately two-circuit, i.e., redundant. The switching elements 16 and 28 controlled by the electronic system 2 can be connected electrically in series, so that the solenoid valve 11 can be switched only after a successful test has been conducted in both brake circuits. On account of the parallel connection of the two-circuit switching elements 16 and 28, the spring actuator 8 is released, even if only one brake circuit is operating properly.

While various embodiments of the present invention have been shown in the drawings and described in detail above, it should be obvious to those persons skilled in the electrically-controlled braking art that various other modifications and adaptations can be made to the invention without departing from the spirit and scope of the appended claims.

I claim:

1. A dual-circuit electrically-controlled fluid pressure responsive brake system for a motor vehicle, said dual-circuit brake system comprising:
   (a) an electronic control device positioned on such motor vehicle to receive a plurality of input signals which are then processed in said electronic control device, said electronic control device generating and transmitting a plurality of output control signals which control said brake system on such motor vehicle;
   (b) a brake means positioned on such motor vehicle for applying and releasing a braking force in response to said control signals generated in said electronic control device;
   (c) a first brake circuit positioned on such motor vehicle, at least a portion of said first brake circuit being located in a position accessible to an operator of such motor vehicle, said at least a portion of said first brake circuit capable of being manipulated by such operator, said first brake circuit including:
   (i) an electrical brake signal value transmitter means electrically-connected to said electronic control device to transmit a signal value representative of a desired brake pressure to be applied by said brake to an input terminal of said electronic control device in response to a manipulation by such operator,
   (ii) a first source of fluid pressure positioned on such motor vehicle, and
   (iii) a fluid pressure modulator positioned on such motor vehicle, said fluid pressure modulator electrically-connected to receive an output control signal from said electronic control device and connected at a fluid pressure inlet port to receive fluid pressure from said first source of fluid pressure and connected on a fluid pressure output port to a first fluid pressure inlet port on said brake to deliver fluid pressure from said first source of fluid pressure to said brake in response to a manipulation of said electrical brake signal value transmitter means by such operator and an output control signal from said electronic control device; and
   (d) a second brake circuit positioned on such motor vehicle, at least a portion of said second brake circuit being located in such position accessible to such operator of such motor vehicle, said at least a portion of said second brake circuit capable of being manipulated by such operator, said second brake circuit including:
   (i) a second source of fluid pressure positioned on such motor vehicle,
   (ii) a parking brake valve connected at a fluid pressure inlet port to said second source of fluid pressure,
   (iii) a manual brake lever connected to said parking brake valve and manipulatable by such operator to position said parking brake valve into one of a running position, a braking position, and a parking position, and
   (iv) a solenoid valve means positioned on such motor vehicle, said solenoid valve means electrically-connected to receive an output control signal from said electronic control device and connected at a fluid pressure inlet port to receive fluid pressure from a fluid pressure outlet port on said parking brake valve and connected on a fluid pressure outlet port to a second fluid pressure inlet port on said brake to deliver fluid pressure from said second source of fluid pressure to said brake through said parking brake valve and said solenoid valve means in response to a positioning of said manual brake lever by such operator and said output control signal from said electronic control device.

2. A dual-circuit electrically-controlled brake system, according to claim 1, wherein said fluid pressure modulator is a solenoid valve.

3. A dual-circuit electrically-controlled brake system, according to claim 2, wherein said brake is spring-applied and fluid-pressure-released.

4. A dual-circuit electrically-controlled brake system, according to claim 3, wherein said fluid pressure is pneumatic and said first source and said second source of fluid pressure are reservoirs.

5. A dual-circuit electrically-controlled brake system, according to claim 4, wherein said brake value signal transmitter means is pedal-operated.

6. A dual-circuit electrically-controlled brake system, according to claim 1, wherein said first brake circuit further includes a pressure-measuring means connected to a fluid pressure communication line intermediate said fluid pressure modulator and said brake, said pressure-measuring means providing a signal to an input terminal of said electronic control device representative of a measured pressure in said communication line.

7. A dual-circuit electrically-controlled brake system, according to claim 1, wherein said second brake circuit further includes a switching element means and a current to control said solenoid valve means is conducted via said switching element means which senses activation of said manual brake lever.

8. A dual-circuit electrically-controlled brake system, according to claim 7, wherein said switching element means senses said activation of said manual brake lever in one of a direct and an indirect manner.

9. A dual-circuit electrically-controlled brake system, according to claim 8, wherein said switching element means is a pressure switch which is engaged by a pressure and released by said manual brake lever.

10. A dual-circuit electrically-controlled brake system, according to claim 8, wherein said switching element means is a switch which senses a position of said manual brake lever.

11. A dual-circuit electrically-controlled brake system, according to claim 1, wherein said brake system further includes a power circuit means operable to control said solenoid valve means in which power is conducted from said electronic system after successful testing via one of a switching element means integrated into said electronic system and an external switch element.

12. A dual-circuit electrically-controlled brake system, according to claim 11, wherein said one of said switching element means integrated into said electronic system and said external switch element further includes a self-locking means.

13. A dual-circuit electrically-controlled brake system, according to claim 11, wherein said electronic system is suplied with current both by an ignition switch and by said switching elements via an input to said electronic system.

14. A dual-circuit electrically-controlled brake system, according to claim 1, wherein said solenoid valve means further includes a pneumatic self-locking means.

* * * * *